(12) United States Patent
Kirkpatrick et al.

(10) Patent No.: US 8,098,993 B2
(45) Date of Patent: Jan. 17, 2012

(54) METHOD AND APPARATUS FOR TRANSPORTING COMPUTER BUS PROTOCOLS OVER AN OPTICAL LINK

(75) Inventors: Peter E. Kirkpatrick, Sunnyvale, CA (US); Assaf Shacham, Sunnyvale, CA (US); Marc Epitaux, Sunnyvale, CA (US)

(73) Assignee: Alpenio, Inc., Sunnyvale, CA (US)

( * ) Notice: Subject to any disclaimer, the term of this patent is extended or adjusted under 35 U.S.C. 154(b) by 782 days.

(21) Appl. No.: 12/059,981

(22) Filed: May 8, 2008

(65) Prior Publication Data

US 2009/0279889 A1  Nov. 12, 2009

(51) Int. Cl.
*H04B 10/24* (2006.01)

(52) U.S. Cl. ........................................................ 398/135

(58) Field of Classification Search .................... 398/22, 398/25, 33, 135–138, 139, 159
See application file for complete search history.

(56) References Cited

U.S. PATENT DOCUMENTS

| 4,727,592 | A | * | 2/1988 | Okada et al. | 714/55 |
| 6,512,617 | B1 | * | 1/2003 | Tanji et al. | 398/137 |
| 7,146,105 | B1 | * | 12/2006 | Tzeng et al. | 398/128 |
| 7,356,213 | B1 | * | 4/2008 | Cunningham et al. | 385/14 |
| 2006/0018664 | A1 | * | 1/2006 | Levinson et al. | 398/135 |

* cited by examiner

*Primary Examiner* — Leslie Pascal
(74) *Attorney, Agent, or Firm* — Gregory & Sawrie LLP

(57) ABSTRACT

A system is provided for implementing PCI Express protocol signals over an optical link. A transmission circuit is used to provide an electrical-to-optical conversion, a receiving circuit provides an optical-to-electrical conversion, and a sideband circuit is used to provide and receive control information.

27 Claims, 6 Drawing Sheets

PCIe Cable Comparison (Prior Art)

PCIe Connector Comparison

Optical Transceiver

PCIe optical adapter card

METHOD AND APPARATUS FOR TRANSPORTING COMPUTER BUS PROTOCOLS OVER AN OPTICAL LINK

BACKGROUND OF THE INVENTION

There are numerous protocols used to communicate information among digital devices. For example, various protocols and systems have been developed for communications among central processing units and associated chip sets, as well as with peripheral devices, such as network interface cards, storage adaptors, graphics cards, and other devices. One protocol which has been developed for transporting computer bus protocols is the PCI-Express (PCIe) protocol.

The PCI-Express protocol provides for a high bandwidth, serialized, full-duplex, point-to-point data communication link. The links are generally used to connect central processing units (CPUs) and chipsets with peripheral devices such as described above. The Peripheral Component Interconnect Special Interest Group (PCI-SIG) defines the specifications for compliance to the PCIe standards.

Rather than use a bus, PCIe systems provide point-to-point full duplex data lanes. A single link may consist of from 1 to 32 lanes. The data rate on each lane is determined by the characteristics of that electrical connection. The connection characteristics are reflected in the PCIe generation specification. PCIe 1.1 provides 2.5 gigabits per second (Gb/s) per lane, PCIe 2 provides 5.0 gigabits per second per lane, and PCIe 3 provides 8 gigabits per second per lane. In a typical computer system each slot carries one, two, four, eight, or sixteen lanes of data between a motherboard and an associated card, usually plugged into a socket on the motherboard. Sixteen lanes of 5.0 Gb/s provides a maximum transfer rate of 80Gb/s (5.0 Gb/s×16) in each direction for PCIe 2.0. After encoding, the raw throughput of a lane is 80% of the data rate. Faster generations require support of the slower rates, and links auto-negotiate the lane speed and number of lanes (link width), according to the capabilities of the devices at each end of the link.

To support the data lanes, the PCIe system provides a set of supporting auxiliary signals, including a clock lane and signals for system control, such as reset, hot plug, and power management. The system also requires a state machine that controls the state of the link, such as the data rate of the lanes, the link width, the power level of the link, and other factors.

The PCI-SIG has specified the base specification which defines PCIe architecture, signaling, protocol and software. It also includes a PCIe Card Electromechanical specification defining interface form factors, as well as a PCIe External Cabling specification which defines connectors and cables for external interfaces. There is currently no specification or standard for transporting the PCIe protocol over optical links.

An array of products exist based on the PCIe standard. These include products designed for direct integration onto personal computer and server computer motherboards, PCIe cards, and other PCIe standard and non-standard form factors.

A standard known as 'PCIe External Cabling Specification Revision 0.9' was released by the PCI-SIG in September, 2006. This specification defines the logical, electrical, and mechanical characteristics of a standards-compliant PCIe copper cabled implementation. This specification supports PCIe 1 signaling only, and a similar specification for PCIe 2 is expected from the PCI-SIG in the future. For higher data rates such as PCIe 2, the reach on such cables is expected to be reduced.

Optical communication links are well known for some technologies. These include Fibre Channel, InfiniBand, and 10 Gigabit Ethernet (10GbE) among others. Sun Microsystems sells an "External I/O Expansion Unit" which implements an optical link emulation of a PCIe bus. All of these optical links and products, however, do not support PCIe-specific features such as sideband lane and encoding, hot plug, receiver detect, electrical idle support, linear clock lane, and others. Some parallel optical links exist, both proprietary and multi-source agreement (MSA) based. These modules, however, suffer from the same disadvantages as the optical communication links and products discussed above, notably they do not support PCIe specific features such as sideband lane and encoding, hot plug, receiver detect, electrical idle support, linear clock lane, and others.

BRIEF SUMMARY OF THE INVENTION

This invention provides a system for transmitting information from an electronic system, such as a data processor, over an optical link. The system provides for conversion of the information to be transmitted from electrical signals to optical signals and reception of information from the optical link and conversion to electronic format. The system also provides for handling of control information and conversion of that control information to and from optical format. In a preferred embodiment the system of this invention is used to transmit and receive information formatted in the PCI Express protocol.

In one embodiment, the system of this invention includes a transmission circuit which is connected to the data processing unit and receives electrical signals from the data processing unit representative of data to be transmitted over the optical communications link. After conversion the signals are transmitted optically over the link. A receiving circuit is also coupled to the data processing unit and to the optical communications link. The receiving circuit receives optical signals from the link representative of data being transmitted over the link to the data processing unit and converts those optical signals into electrical signals. A link controller circuit provides an interface for control signals and is also coupled to the communications link. The link controller circuit converts electrical control signals, protocol-specific events, bus emulation information, and user messages into optical signals and provides them over the communications link, and also receives optical signals representative of control information from the link and converts those received signals into electrical signals to be provided to the data processing unit.

Preferably, the link controller circuit also includes a controller for providing an indicia across the optical communications link of the presence or absence of the data processing unit. In addition, an idle sense circuit can be coupled to the data processing unit and used to control the transmitting circuit, reducing its power consumption when signals are not being provided by the data processing unit. The subsystem preferably contains a circuit capable of detecting the individual lanes present in the data processing unit and conversely presenting valid lanes to the data processing unit. Typically, separate dedicated optical fibers are provided for transmission of data, reception of data, transmission of control information, and reception of control information.

DETAILED DESCRIPTION OF THE INVENTION

This invention provides implementation for the optical transport of computer bus protocols requiring specific control information, such as PCI-Express protocol information, over an optical link. The advantage of enabling PCIe or other complex protocols over optical transport media, as opposed to standard state-of-the-art copper cables, are numerous. Optical media are low loss, immune to electromagnetic interference and cause minimal distortion to transmitted signals. Thus the distance supported by an optical link is much greater than that of a copper cable for a given data rate. Furthermore, as data rates increase, the effect becomes even more pronounced. Herein we describe the invention in the context of a PCIe implementation, although it will be appreciated that other protocols can be similarly handled.

Figure 1:
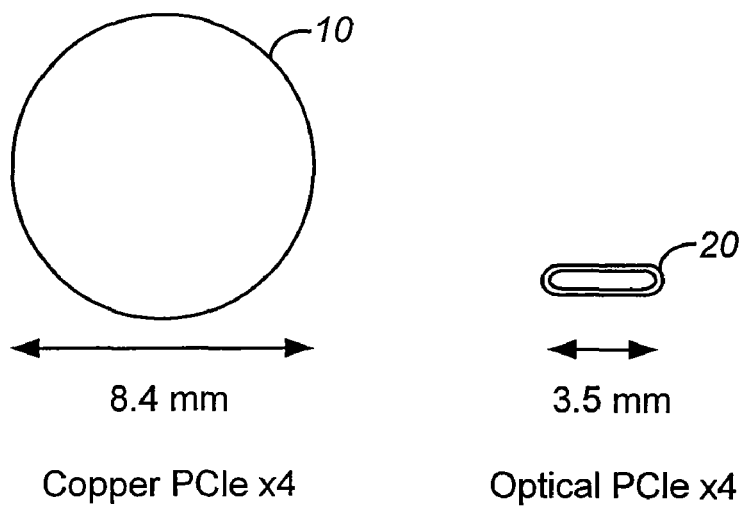
FIG. 1 is a diagram comparing cross sections of a PCIe copper cable and an optical ribbon.

A typical PCIe copper cable such as depicted in FIG. 1 can carry PCIe 1 signals over about seven meters. In contrast, an optical fiber, as also depicted in FIG. 1, can carry PCIe 1 signals well over 100 meters. For PCIe 2, the same copper cable will support less than two meters, while the optical fiber supports well over 100 meters, representing more than an order of magnitude improvement.

Figure 2:
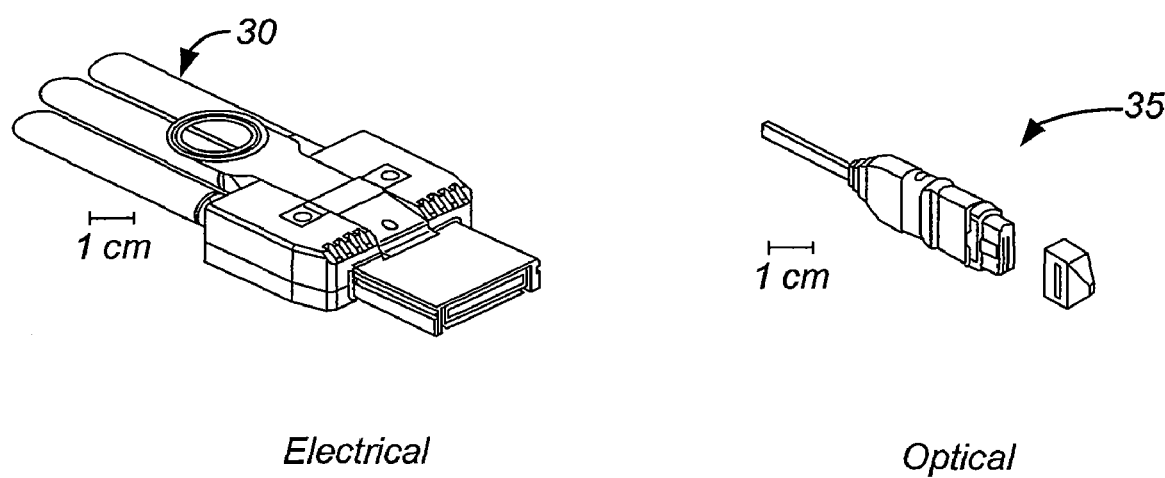
FIG. 2 is an illustration comparing a connector for a PCIe copper cable with a connector for a PCIe optical cable.

A second benefit of optical fiber is the density with which interconnections can be provided. At high data rates, for example, greater than 2.5 gigabits per second, electrical connectors and cables become bulky, heavy, and difficult to handle and interconnect. In contrast, parallel fiber optical cables and connectors are lightweight and easy to use. For example, a typical copper PCIe cable 10 will have a cross-sectional area on the order of 222 square millimeters, while an optical fiber cable 20 of equivalent capacity will have a cross-sectional area on the order of 10 square millimeters. FIG. 2 is a diagram illustrating a comparison between a classic electrical PCIe connector 30 and an optical connector 35. The difference in enabled density of interconnections is apparent.

Another difference between optical fibers and copper cables for carrying PCIe information is power consumption. At the date rates required by PCIe, the high loss and large RF reflections in the cables and connectors in a copper link require that the devices that drive the signals across the link, and the devices that receive the signals from the link, dissipate a considerable amount of power if low bit error rates are to be achieved. In contrast, the low power electro-optical conversion provided by optical technology, as well as lower power driver and detection circuitry, enable power savings. This power savings is magnified as data rates increase. At 10 gigabits per second, a typical electrically-cabled link requires about a watt of power for reliable transmission. An equivalent optical link requires only 100 milliwatts, an order of magnitude improvement.

Optical connectivity also provides cost savings compared to copper cabling. With copper cabling, mechanically and electrically complex connectors, complex cable assemblies, and various electronic equalization techniques are required. In the simplified optical system, even with both electro-optical conversion and optical-electrical conversion, lower costs result. Furthermore, optical fibers provide the benefit of scalability. Optical fibers have extremely high bandwidth and low loss, enabling a scalable platform for future increases in data rates. Copper cables, in contrast, become less desirable as data rates increase.

Figure 3:
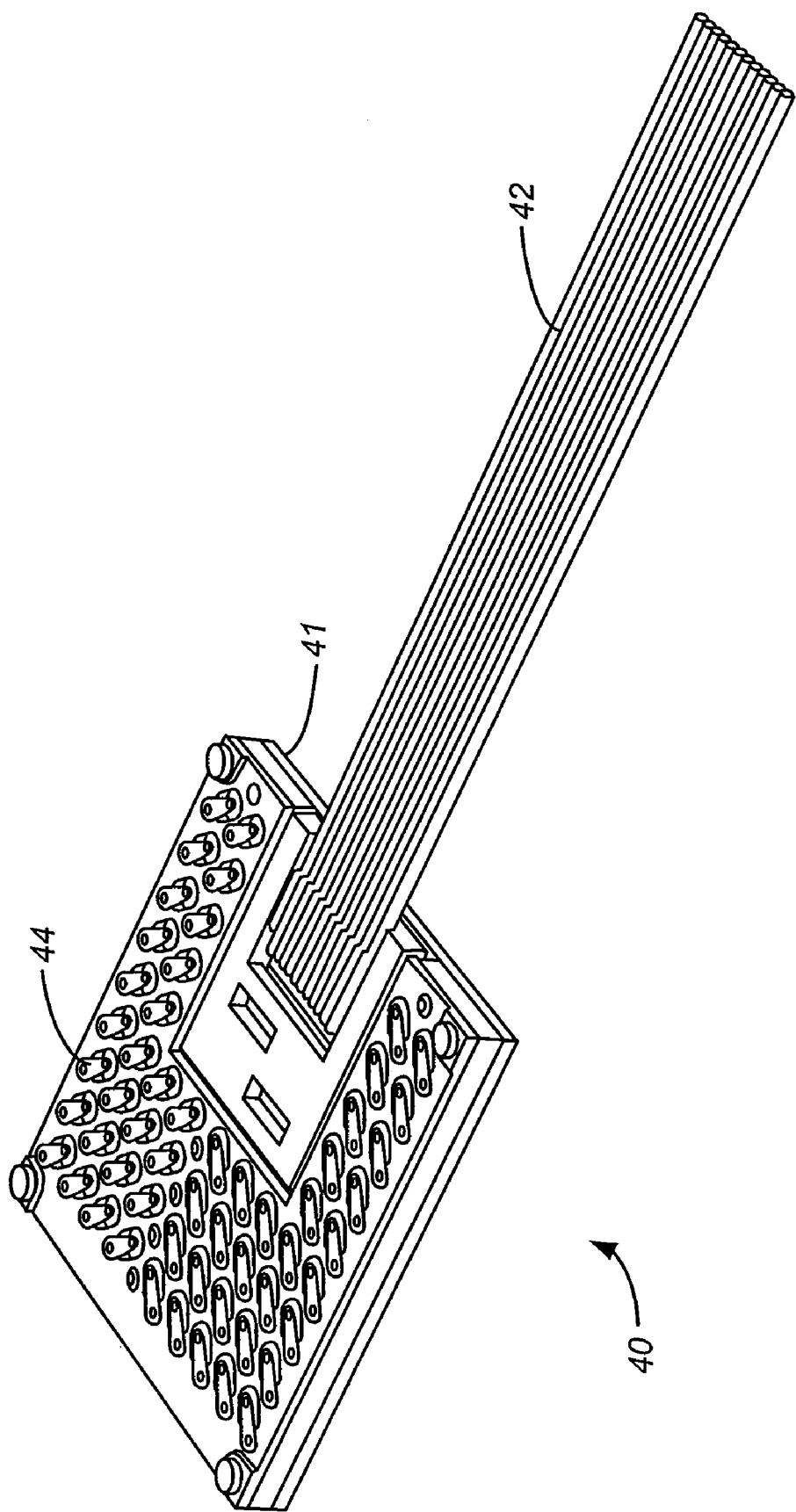
FIG. 3 illustrates an optical transceiver.

This invention provides a subsystem for implementing computer bus protocols over an optical link. Implementation requires both electro-optical conversion and optical-electrical conversion. While this can be achieved using separate transmission and reception devices, in the preferred embodiment an optical transceiver is employed. FIG. 3 illustrates in more detail the optical transceiver 40 employed in the preferred embodiment of this invention. The transceiver shown is described in more detail in commonly-owned copending U.S. patent application Ser. No. 11/681,950, filed Mar. 5, 2007. The optical transceiver performs an electrical-to-optical (EO) conversion of the electrical signals received at the transmitter, sends them through an optical fiber. It also performs an optical-to-electrical (OE) conversion of the optical signals received on the link. The EO and OE conversions can be included in a single package as a transceiver, or they may be packaged individually as separate transmitters and receivers. In a preferred embodiment, the EO conversion is achieved using vertical cavity, surface emitting lasers (VCSELs), and the OE conversion is achieved using positive-intrinsic-negative (PIN) photo detectors, each with associated amplifying electronics. Further, in the preferred embodiment, the EO and OE conversions are performed across an array of devices, employing parallel optical fibers for transmission. In some embodiments, a combination of array and singlet devices are employed. In FIG. 3, the main package 41 is depicted, as well as the optical fibers 42. The electrical contacts 44 are shown arranged in a U configuration around the body of the package. In other embodiments, the EO and OE portions of the system are attached directly to the same printed circuit board as the data processing devices.

Figure 4:
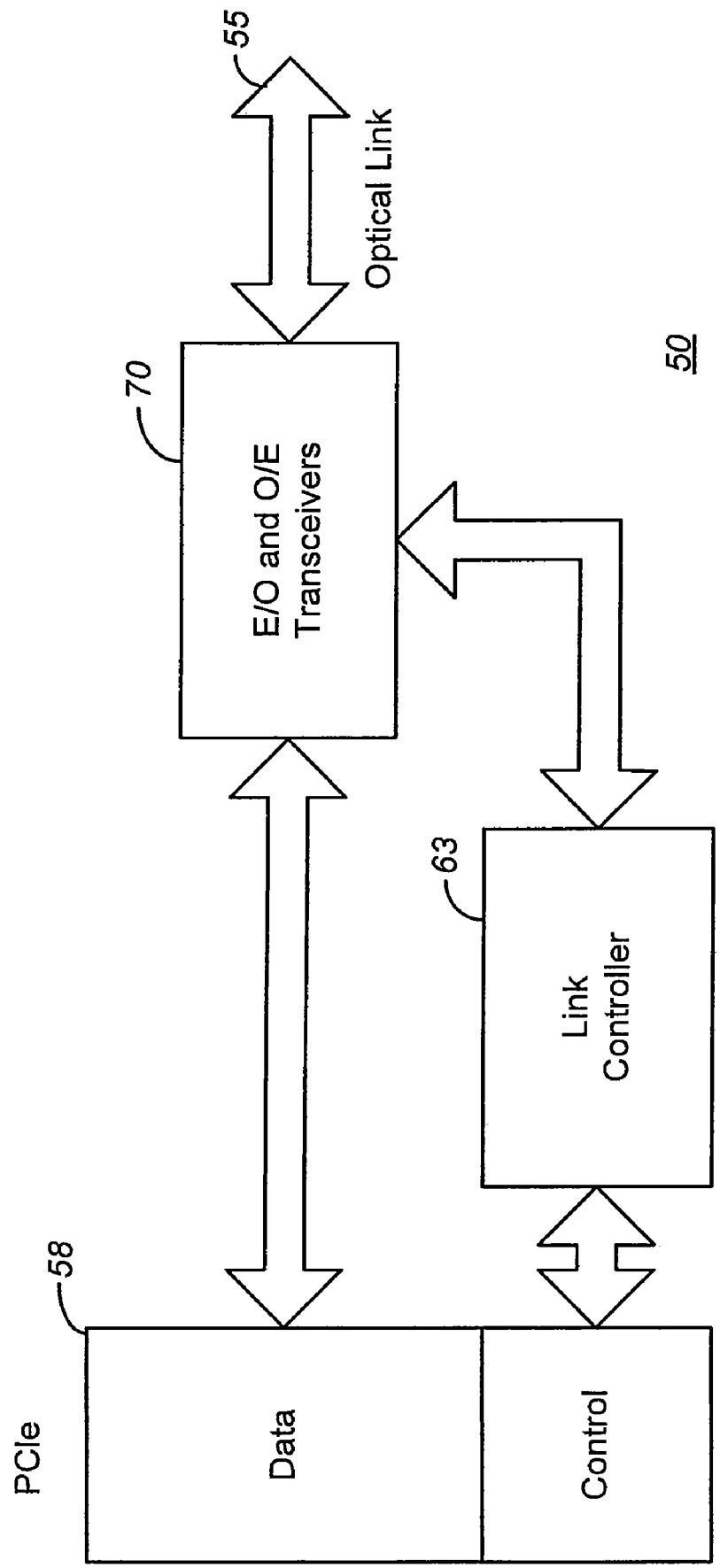
FIG. 4 is a simplified block diagram of a subsystem for a PCIe optical link.

FIG. 4 is a simplified block diagram of a PCIe subsystem 50 according to a preferred embodiment. The PCIe interface 58 both transmits information over, and receives information from, the optical link 55. The operations of transmission and reception are simply reversed, and as a result in the following only transmission over the link is described. Interface 58 receives the PCIe data and control signals from a data processing unit (not shown) of desired type and ultimately provides those data and control signals to an optical link 55 for transmission to a remote data processing unit or other similar apparatus. Subsystem 50 receives control signals through a control portion and receives data signals through a data portion. The data signals are converted from electrical to optical signals by the transceivers 70. At the same time the control signals are provided to a link controller 63 for handling. Depending upon the functionality desired, the link controller then provides these control signals to the transceivers, again for conversion. The link controller implements PCIe control functions as is discussed below.

The optical link 55 can be of any desired material, but is preferable a bundle of optical fibers. The information can be sent and received using separate fibers, or multiplexed onto one fiber. As will be discussed below, preferably separate lanes are used. Alternatively the information can be encoded onto one of a few fibers using different wavelengths. Furthermore, the optical link can comprise optical waveguides.

Figure 5:
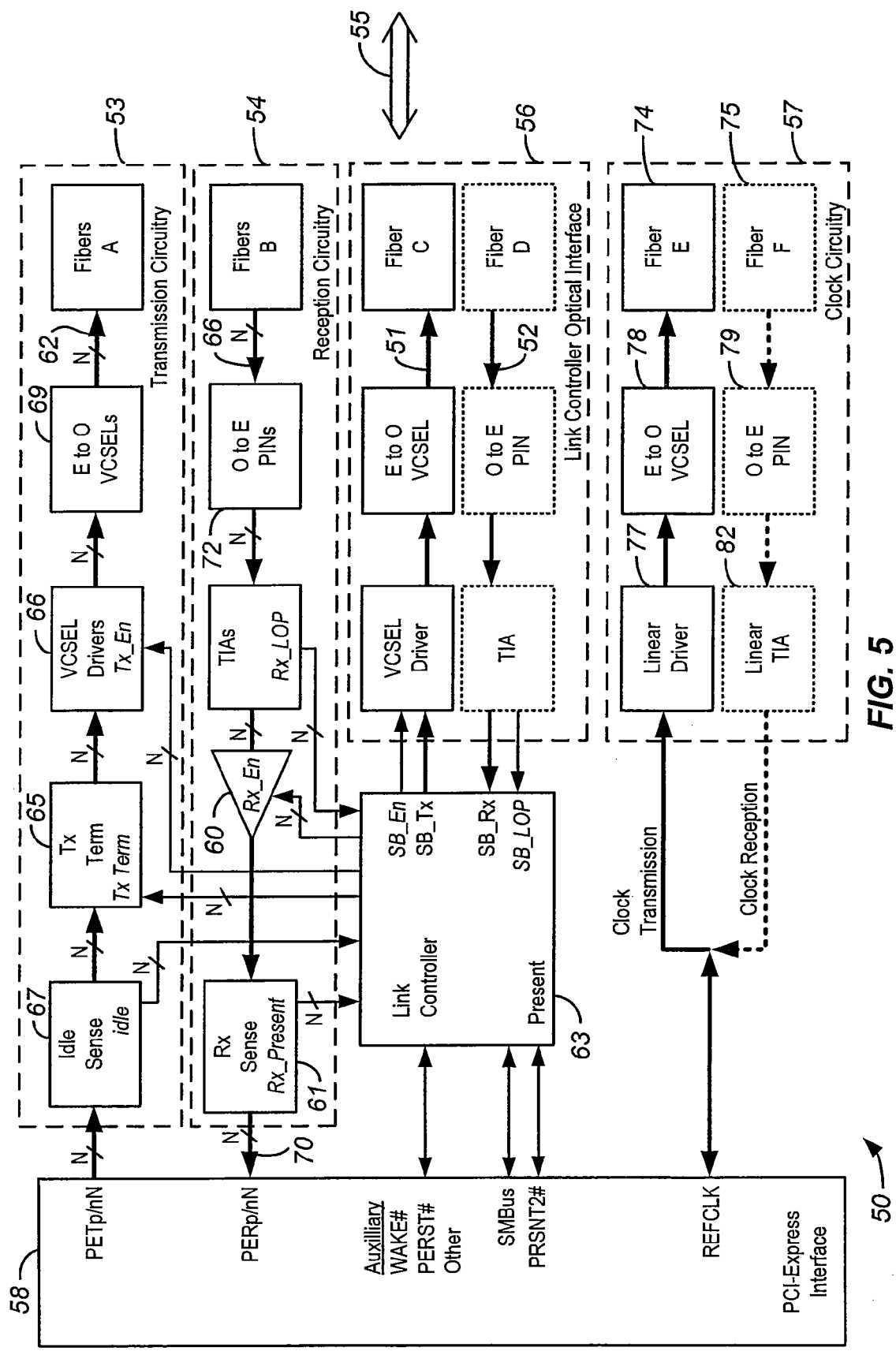
FIG. 5 is a detailed block diagram of a subsystem implementing one end of an optical PCIe link.

FIG. 5 is a more detailed block diagram illustrating a preferred embodiment of a PCIe subsystem 50 which provides an interface for PCIe signals received through an appropriate connector 58 on the left side of the figure, to optical fibers A-F on the right side of the figure. The electrical signals are provided by a desired interface, typically implemented by some form of data processing apparatus. In the preferred embodiment the data processing apparatus includes a PCIe interface, as depicted. Additional detail regarding each of the identified signals in FIG. 5 is provided below. Edge connector 58 typically will be present on a motherboard of a computer system, peripheral device, switching system, or other information handling apparatus. Collectively herein the signals are described as originating from a data processing unit. Of course it is not necessary that the edge connector have any particular configuration, or that there be a connector per se. Generally all that is required is that there be a source of signals of the desired protocol provided to the subsystem 50. Subsystem 50 provides full conversion of all PCIe signals to an optical interface transmitting them to a ribbon fiber connector 55 which in the preferred embodiment includes fibers A, B, C, D, E, and F. In a typical implementation another subsystem will be provided at the "other end" of the optical link 55 to receive the optical signals from subsystem 58 and provide optical signals to it as well. In one embodiment, the subsystem 50 includes a transmit data path 53, a receive data path 54, sideband circuitry 56, and a clock transmission and reception circuitry 57. Each of these portions of the block diagram are explained below. Of course not every implementation of a complete subsystem requires all of blocks 53, 54, 56, and 57.

The PCIe edge connector 58 preferably interfaces to a PCIe "bridge" which can represent a PCIe Root Complex, a PCIe switch, a PCIe endpoint or other PCIe device. The transmission circuitry 53, the receiving circuitry 54, the sideband circuitry 56, and the clock circuitry 57 are electrically connected to the PCIe interface 58 and connected via an optical ribbon cable implementing link 55 to another optical PCIe subsystem. Preferably a similar subsystem 50 is provided at the other end of the link 55. In the preferred embodiment N datapath lanes 62 are provided for transmission of data, and N datapath lanes 66 are provided for reception of data. Of course a different number of transmission lanes than reception lanes can also be implemented. Preferably, each transmission lane and each reception lane is coupled to a separate optical fiber. Thus for the example, if N=4, a ten fiber optical ribbon will be used, with 4 fibers for transmission of data, 4 fibers for reception of data, and 2 fibers 51, 52 for the sideband circuitry. To enable use of industry standard 12-fiber ribbon, some lanes may be left unused. If N=4 and a clock lane is also supported, 12 fiber ribbon would be employed with all lanes in use. If more lanes are required than 12 fibers will support, multiple ribbons may be employed.

To be fully compliant with the present PCIe standards, the optical transceiver must provide EO and OE conversions on data lanes capable of transferring signals at 2.5, 5.0, or 8.0 Gb/s (or more) per lane, depending upon the particular PCI generation implemented. In the preferred embodiment, the transceiver provides four transmit lanes and four receive lanes, thereby enabling four full duplex data lanes capable of PCIe 1, PCIe 2 or PCI 3 speeds.

Table 1 below lists each of the signals identified in FIG. 5. For each signal the meaning of the signal is given, as well as its location in the diagram, the implementation technique for that signal, and an explanation of its logic state.

TABLE 1

Signals Used in FIG. 5

| Signal | Meaning | Location | Technique | Truth |
|---|---|---|---|---|
| Present | Endpoint present | PCIe Interface (PRSNT2#) | Upstream - control CMOS logic level, downstream - sense CMOS logic level | Present = True when link present |
| SB_En | Sideband optical enable | Sideband Transmitter (VCSEL Driver) | Allow current to flow to sideband VCSEL | SB_En = True, VCSEL is 'on' |
| SB_LOP | Sideband loss of optical power | Sideband Receiver (PIN + TIA) | Detect current proportional to light on SB link | SB_LOP = True when no power |
| Rx_Present_N | Receiver lane N presence detect | Receive Datapath (Rx Sense) | Sense low impedance termination on receiver output | Rx_Present = True when low impedance |
| Tx_Term_N | Transmitter lane N termination enable | Transmit Datapath (Tx Term) | Switch termination between low/high impedance | Tx_Term = True impedance is set low |
| Idle | Link in idle state | Transmit Datapath (Idle Sense) | Measure AC signal on input to transmit datapath | Idle = True when link in idle state |
| Tx_En_N | Transmitter lane N optical enable | Transmit Datapath (VCSEL Driver) | Allow current to flow to datapath VCSEL | Tx_En = True, VCSEL is 'on' |
| Rx_LOP_N | Receiver lane N loss of optical power | Receive Datapath (PIN + TIA) | Detect current proportional to light on receive link | Rx_LOP = True when no power |
| Rx_En_N | Receiver lane N output enable | Receive Datapath | Enable signal output on receiver | Rx_En = True, output is enabled |

The PCIe protocol provides for dedicated sideband signals (also referred to as auxiliary signals) to provide system-level features and improved performance. These signals assure the PCIe systems can be hot-pluggable and safely removed, as well as supporting the various clock architectures. The sideband signals are discussed below. Other signals, such as user messages or local bus emulation, are also enabled by this system as a result of the encoded nature of the signaling.

On the transmit 53 and receive 54 paths of the link for a PCIe implementation, it is desirable to enable compatibility of links in implementations having differing numbers of lanes. With respect to the receive path 54, PCIe receiver presence detect, e.g. of a remote data processing unit coupled to link 55, is based on the charging time of DC blocking capacitors and output termination resistors of the data processing unit. The receive datapath 54 contains a receiver sense circuit 61 capable of detecting the presence, based on charging time of each lane, of a data processing unit connected to the receive datapath fibers B.

The link controller 63 is implemented as an field programmable gate array, although it could also be implemented in a general purpose CPU, microcontroller, application specific integrated circuit (ASIC) other logic device, or even integrated into the optical transceiver. Controller 63 collects the various input signals from the PCIe edge connector 58 for transmission on the sideband link 56. If no fiber is present, a signal is transmitted to inform the sending unit that a connection is not present. The receive datapath 54 is also capable of detecting when a valid termination is present at its outputs, as would a compliant PCIe receiver. As the link width scales, for example from x4 to x8, typically only one sideband path is required.

Regarding the transmit path over fibers A, the data processing unit at the other end of the link 55 detects the presence of the transmission based on the charging time of the DC blocking capacitors and output terminations of the transmit circuitry. The transmit datapath 53 is capable of providing a differential input termination of 100Ω for each lane during normal lane operation to ensure signal integrity, and a high-impedance termination to indicate to the transmitting device coupled to interface 58 that no lane is present. This invention provides two methods of implementing these two impedance states. In one embodiment, a series switch within the transmit termination block 65 changes the input impedance of the transmit data lane 53 between 100Ω and a high impedance condition. An alternative technique is to switch (shunt) the termination network within the appropriate lane drivers 66. The lane switches within network 65 are controlled by the link controller 63, and are enabled under the condition that a valid lane is detected by the opposite end of the link.

The subsystem 50 is also capable of handling the PCIe link state called 'Electrical Idle' (EI), and to present the EI conditions on the output of the link 55. This function is implemented by the idle sense circuit 67. The idle sense circuit is of well known design and detects when modulation is not present. In a preferred embodiment, a direct connection between the idle sense circuit 67 and the driver powers down the lasers 69 in the subsystem in response. In the presence of the EI condition at the inputs (|Vdiff|<20 mV), the output average optical power is reduced to zero. When the peak detector output falls below this threshold, the transmit driver 66 stops current flow to the lasers 69, reducing the output power to zero. In another embodiment, the idle sense circuit 67 indicates the idle condition to the link controller 63, which in turn relays the shutdown signal to the drivers 66, stopping current flow to the lasers 69.

An alternative method of relaying the electrical idle signal to the remote end of the link 55 is also possible. In this case, the idle sense circuit 67 indicates the idle condition to the link controller 63. The link controller 63 passes a message on the sideband path 56 to the link controller (not shown) at the opposite end of the link 55, which then presents the idle condition there.

The receiver 54 recognizes when one of these conditions is present in one of two ways, and then presents the EI condition (|Vdiff|<20 mV) on its outputs 60. One method of measuring average output power is to employ a circuit to measure the average current flow to the photodiodes 72, known to be proportional to average output power. This is then compared to a threshold value. A method to detect optical modulated amplitude is to use an electrical AC peak detector after a transimpedance stage whose output corresponds to the received optical modulated amplitude, and which is compared to a threshold value. In both cases, when the output measurement falls below the threshold, the output stage of the receiver 54 is 'squelched' or turned off to present the EI condition on its outputs 60. In an alternative method, an idle message received via the sideband 56 is provided by the link controller 63 to the receive circuitry 54, which reacts by squelching its output 60.

Table 2 illustrates four sideband signals and the requirements for the upstream and downstream subsystems in a cabled environment.

TABLE 2

Auxiliary Signals - PCIe Cabling Specification

| Signal | Upstream Subsystem | Cable Assembly | Downstream Subsystem | Meaning |
|---|---|---|---|---|
| CPRSNT# | Required In | Required | Required Out | Cable present detect |
| CPERST# | Required Out | Required | Optional In | Cable Reset |
| CPWRON | Required Out | Required | Optional In | Cable Power On |
| CWAKE# | Optional In | Required | Optional Out | Cable Wake |

Related signals on the standard PCIe card edge 58 may be communicated across the sideband as well. Such signals include 'present' (PRSNT2#), 'wake' (WAKE#), and signals dedicated to emulation of the System Management Bus (SMBus SMCLK and SMDAT).

As shown by FIG. 5, this invention provides for a dedicated physical path 56 within the link, including detection of the sideband signals from the other side of the link, encoding of the signals in a serial data stream, EO conversion of the digital encoded signal, transmission of the signal across the optical transmission medium, OE conversion, decoding of the signals, and presentation of the individual sideband signals at the receive end of the link. Alternately, the information communicated by the link controller could be transmitted on the same physical path as the data, through such methods as being modulated on the high speed datapath or coupled to the same fiber using wavelength division multiplexing (WDM).

The preferred protocol for the sideband link 56 is discussed next. In general the sideband protocol is used to communicate information required for PCIe optical link management between the link controller 63 of subsystem 50 and a similar link controller coupled to link 55. Once the link is established, the sideband channel (fibers C and D) can be used to pass user messages sent by a higher layer, for example, topology discovery messages. Packets are exchanged periodically on the link when information is to be updated. Of course, alternate message formats such as frames could also be used.

Communication on the link between subsystems 50 and 50' is preferably encoded using well known 8 bit-10 bit (8b10b) coding to maintain DC balance and limit the run length of consecutive identical digits. In 8b10b code, 10-bit symbols are transmitted to represent 8-bit data bytes and distinct control symbols. 8b10b coding is well known and is often used in data links as a result of its robust format. Of course other desired coding formats may be used in the sideband link.

The sideband packet structure provides data packets of varying length and is illustrated in Table 3 below. The header includes three 8-bit bytes, one byte to indicate a start of the header, one byte to designate the type of packet in the payload and one byte to designate the payload length. The header, payload and trailer are encoded into 10-bit symbols by the 8b10b encoding for transmission.

The header is used to indicate packet start. The header is the 8b10b control symbol K27.7, followed by bits indicative of packet type, and bits indicative of the packet length. The defined frame types include control packets and general data packets, as well as special packets for establishing and maintaining the sideband link. The control packets contain information preferably including lane presence, link power state, system-level hot-plug, presence, reset, and wake information. User data packets may be variable in length and can carry application-specific payloads. In addition, preferably special short packets are employed to implement link-level latency-sensitive messages required to be encoded in as few bits as possible (e.g. EI entry/exit). These low latency packets employ a unique start symbol, a small number of payload bits, and a checksum for error detection.

TABLE 3

Sideband General Frame Format

| Header | | | Payload | Trailer | |
|---|---|---|---|---|---|
| STP K27.7 | Packet Type | Payload Length | 1, 2, more DWs ... | CRC | END K29.7 |

Some PCIe architectures require a separate reference clock signal be transmitted along with the data lanes. As shown in FIG. 5, this invention provides for an optional clock lane 57 that meets PCIe reference clock requirements. Although a subsystem may include both transmit 74 and receive 75 clock lanes, only one would be employed in an operating link. In transmission, a linear clock amplifier 77 and EO conversion 78 are added as an additional part of the sideband circuitry, and an additional lane 74 (fiber E) is provided, dedicated to the transmission of clock signals. In reception, a OE conversion 79 and linear clock amplifier 82 are provided, as well as additional lane 75 (fiber F), dedicated to the reception of clock signals. The dedicated clock lane 74 and 75 are provided for the following reasons. When both transmit and receive devices on one lane share a common reference clock, the transition between different link states can happen faster. In particular, L0s-L0 exit latency is reduced. Furthermore spread spectrum clocking can be employed, enabling the clock used to transmit data symbols to be modulated to spread the power of the clock signal across frequency to alleviate electromagnetic interference in the system. For a receiver to function properly when receiving data from a transmitter using spread spectrum clocking, the receiver must derive its internal clock from the same reference clock as the transmitter.

The optional dedicated clock lane 74, 75 in the subsystem 50 allows for a forwarded reference clock. Throughout the link 55, the transfer function of this lane remains linear to prevent distortion of the clock signal. While a fixed frequency clock may be transmitted via a nonlinear channel with little distortion or added jitter, a spread-spectrum clock would be degraded through a nonlinear channel. This requires that the electrical-to-optical and optical-to-electrical conversions remain linear. On the transmit path 74, the driving amplifier 77 for the clock lane keeps the signal level within the linear range of operation of the transmitting device 78, and does not have a limiting (nonlinear) transconductance (voltage to current) characteristic. On the receive path 75, the detecting amplifier 82, preferably a transimpedance amplifier (TIA), also remains in the linear range without a limiting characteristic. Due to the large dynamic range of the received signal, an automatic gain control characteristic is preferred.

In a system where spread spectrum clocking is employed, but transmitting the clock is not desired, clock isolation can be used to separate the upstream and downstream clock domains. This is a feature integrated into PCIe devices such as a PCIe Bridge connected to interface 58, implemented using elastic buffers between the data paths in the separate clock domains.

The sideband circuitry 56 enables various special capabilities for the subsystem 50 herein. Several examples are described below. One feature enables the subsystem 50 to detect the presence of a data processing unit coupled to the optical link or the connection of the optical link to the subsystem. This feature can propagate the PCIe Hot Plug event when a new connection is established or when indicated by an endpoint. When the subsystem 50 and an optical link 55 are first connected, the connection is detected by the link controller 63 and the link controller asserts the "present" signal. When a link controller detects the presence of an endpoint, it will similarly send the sideband message "Hot Plug" and the remote link controller asserts the 'present' signal. When the endpoint is removed or when the link is disconnected, the link controller de-asserts the 'present' signal. The sideband circuitry can also propagate the 'reset' signal downstream from a host to an endpoint.

Another feature enabled by the sideband controller is detection of the presence of the lanes of the data processing unit at the other end of the optical link 55. This feature enables the transmission side (including lasers) to be powered off when no receiver is present or when the receiver is disabled. This feature supports the power saving variable link width in PCIe systems. In this implementation, a datalane is detected using charging time (as described above). In response the subsystem sends a message "Rx Presence", indicating which lanes are present. The remote subsystem receives the message and in response terminates the corresponding transmitter inputs (FIG. 5, block 65). For lanes that exist within the transceiver subsystem, but are not present in the data processing unit, the lasers and receivers can be disabled to save power and to prevent the accidental transmission of erroneous data.

The ability to reduce power consumption is also enabled by the sideband circuitry. This feature is enabled by the upstream link controller detecting an idle condition (as explained above). In response to that event the upstream controller turns off the laser drivers 66. The downstream controller detects that no signal is being received, and in response disables the reception circuitry 54. Alternatively the system can be placed in an idle condition in which the transmitters remain enabled but the receiver outputs are disabled. In this situation the upstream controller detects an idle condition and sends an "Idle" message to the downstream controller over the sideband link. The downstream controller receives the message and turns off the receiver circuitry 56.

Figure 6:
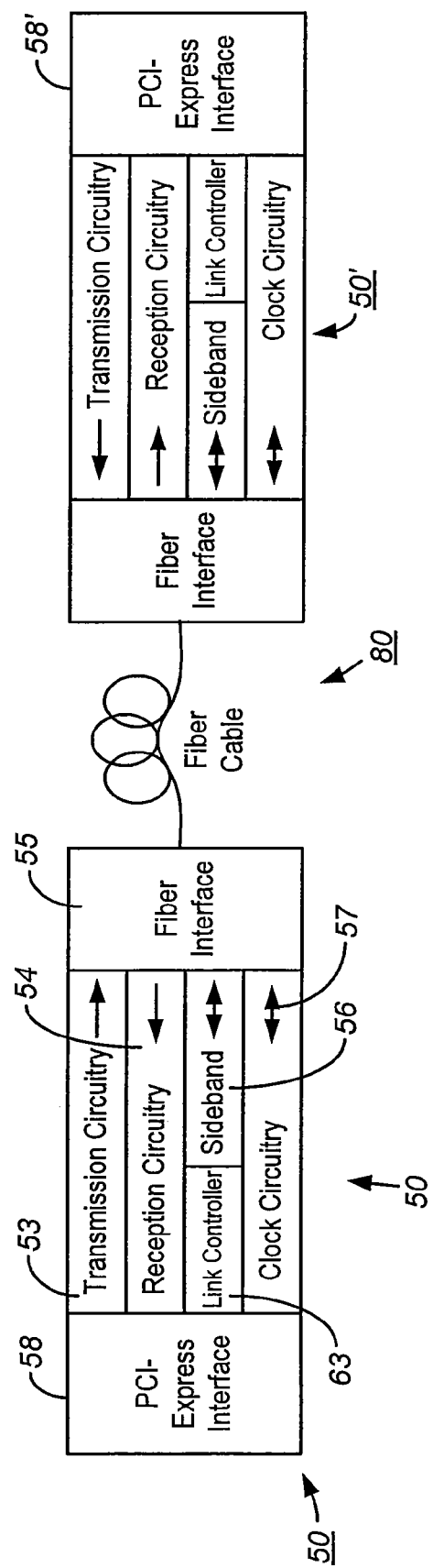
FIG. 6 illustrates both ends of a PCIe optical link.

FIG. 6 is a diagram illustrating a complete PCIe link 80 which comprises two subsystems 50 and 50'. Each of the subsystems 50 and 50' corresponds to the subsystem 50 described in conjunction with FIG. 5. The subsystems may operate in asymmetric manner, for example if used in a PCIe system, links have an upstream/downstream directionality which alters the nature of signals such as 'present' and 'wake' and the transmission/reception of the reference clock.

Figure 7:
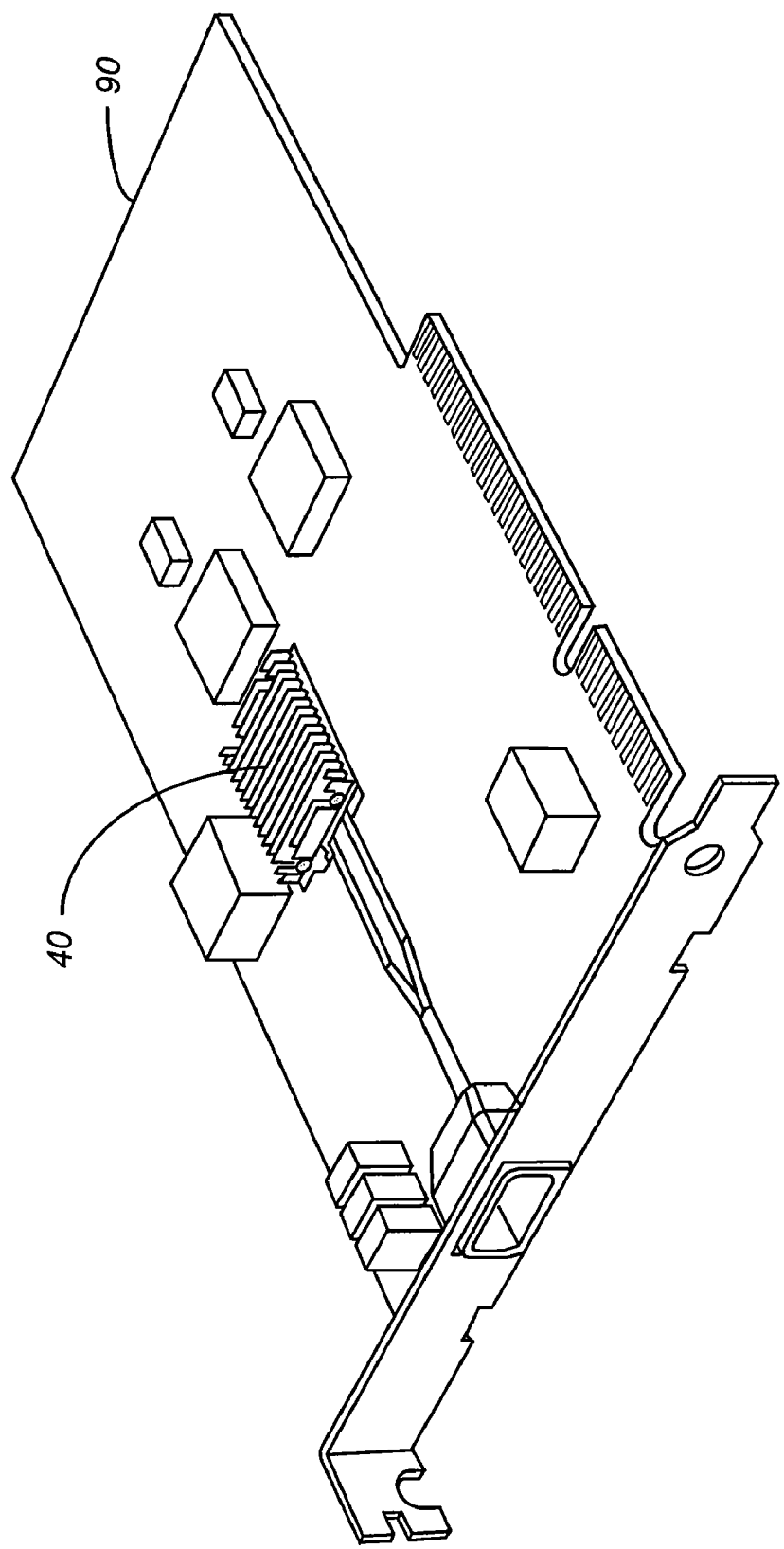
FIG. 7 illustrates a PCIe optical adaptor card.

The subsystem described herein may be implemented in any desired form factor. For example, one configuration is shown in FIG. 7 in which a PCIe adapter card 90 includes the EO/OE conversion device 40 using an optical transceiver, together with support circuitry and logic. Two such cards— one at each end of the link—are required to form a complete link 80 as shown in FIG. 6. Of course it is not necessary that one end of the link be implemented with a subsystem having form factor matching the opposite end of the link.

Of course other form factors may also be used. On a server or switch system, the optical transceiver, support circuitry and logic can be included on a mezzanine card, which interfaces to the host chipset. Another form factor, not shown, is to mount the optical transceiver and support circuitry directly to a host printed circuit board such as a server or switch motherboard.

What is claimed is:

1. A transceiver subsystem for an optical communication link, the transceiver subsystem comprising:
   a transmission circuit receiving first electrical signals from a data processing unit representative of data to be transmitted over the optical communication link and converting the first electrical signals into first optical signals to be transmitted over the optical communications link;
   a receiving circuit receiving second optical signals from the optical communication link representative of data transmitted over the optical communication link and converting the second optical signals into second electrical signals to be provided to the data processing unit;
   a link controller circuit receiving third electrical control signals from the data processing unit representative of control signals to be transmitted over the optical communications link and converting the third electrical signals into third optical signals to be transmitted over the optical communications link, and receiving fourth optical signals from the optical communication link representative of control signals transmitted over the optical communication link and converting the fourth optical signals into fourth electrical signals to be provided to the data processing unit; and
   wherein the link controller circuit provides notification over the optical communications link when the data processing unit is connected and when the data processing unit is disconnected from the optical communications link.

2. The subsystem of claim 1, comprising:
   a detector providing indicia of one impedance state when individual lanes of the optical communications link are coupled to the data processing unit, and indicia of a second impedance state to the communications link when the individual lanes are not coupled to the data processing unit; and
   a switch providing a first impedance state to the data processing unit when an individual lane is present, and a second impedance state to the data processing unit when an individual lane is not present; and
   wherein the link controller circuit provides notification over the optical communications link of the presence of lanes connected to the data processing unit.

3. The subsystem of claim 2, comprising:
   an idle sense circuit monitoring the data processing unit to determine when signals are not present to be transmitted by the transmission circuit and in response providing a signal indicative of an idle condition; and
   a receiver disable circuit disabling an output of the receiving circuit upon indication of the idle condition.

4. The subsystem of claim 3, comprising:
   a transmitter disable circuit, the transmitter disable circuit stopping current flow to a laser upon indication of the idle condition; and
   a loss of optical power indicator for signaling when no laser power is present, and controlling the receiver disable circuit.

5. The subsystem of claim 3, wherein the link controller circuit transports user messages.

6. The subsystem of claim 3, wherein PCI-Express protocol information is conveyed and the link controller circuit provides PCI-Express auxiliary signals.

7. The subsystem of claim 3, wherein the link controller circuit enables emulation of a local bus interface across the optical communications link.

8. The subsystem of claim 3, wherein the link controller circuit includes a clock circuit for buffering clock signals, the clock circuit be coupled to the data processing unit and to the optical communications link and providing clock signals to the optical communications link.

9. The subsystem of claim 2, comprising:
   a transmitter disable circuit, which upon indication of the non-presence of a lane of the data processing unit turns off current flow to a laser coupled to the lane for which the indication of non-presence has been provided to reduce optical output power of the laser to substantially zero; and
   a receiver disable circuit, which upon indication of the non-presence of a lane, disables an output of the receiving circuit.

10. A transceiver subsystem for an optical communication link, the transceiver subsystem comprising:
    a transmission circuit receiving first electrical signals from a data processing unit representative of data to be transmitted over the optical communication link and converting the first electrical signals into first optical signals to be provided over the optical communications link;
    a receiving circuit receiving second optical signals from the optical communication link representative of data transmitted over the optical communication link and converting the second optical signals into second electrical signals to be provided to the data processing unit;
    a link controller circuit receiving third electrical control signals from the data processing unit representative of control signals to be transmitted over the optical communications link and converting the third electrical signals into third optical signals to be transmitted over the optical communications link, and receiving fourth optical signals from the optical communication link representative of control signals transmitted over the optical communication link and converting the fourth optical signals into fourth electrical signals to be provided to the data processing unit; and
    a detector providing indicia of one impedance state when individual lanes of the optical communications link are coupled to the data processing unit, and indicia of a second impedance state to the communications link when the individual lanes are not coupled to the data processing unit; and
    a switch providing a first impedance state to the data processing unit when an individual lane is present, and a second impedance state to the data processing unit when an individual lane is not present; and wherein the link controller circuit provides notification over the optical communications link of the presence of lanes connected to the data processing unit.

11. The subsystem of claim 10, comprising:
an idle sense circuit monitoring the data processing unit to determine when signals are not present to be transmitted by the transmission circuit and in response providing a signal indicative of an idle condition; and
a receiver disable circuit disabling an output of the receiving circuit upon indication of the idle condition.

12. The subsystem of claim 11, further comprising:
a transmitter disable circuit, the transmitter disable circuit stopping current flow to a laser upon indication of the idle condition; and
a loss of optical power indicator for signaling when no laser power is present, and controlling the receiver disable circuit.

13. The subsystem of claim 11, wherein the link controller circuit transports user messages.

14. The subsystem of claim 11, comprising conveying PCI-Express protocol information, wherein the link controller circuit provides PCI-Express auxiliary signals.

15. The subsystem of claim 11, wherein the link controller circuit enables emulation of a local bus interface across the optical communications link.

16. The subsystem of claim 11, wherein the link controller circuit includes a clock circuit for buffering clock signals, the clock circuit coupled to the data processing unit and to the optical communications link and providing clock signals to the optical communications link.

17. The subsystem of claim 10, comprising:
a transmitter disable circuit, which upon indication of the non-presence of a lane of the optical communications link turns off current flow to the laser to reduce its optical output power to substantially zero; and
a receiver disable circuit, which upon indication of the non-presence of a lane, disables an output of the receiving circuit.

18. A transceiver subsystem for an optical communication link, the transceiver subsystem comprising:
a transmission circuit receiving first electrical signals from a data processing unit representative of data to be transmitted over the optical communication link and converting the first electrical signals into first optical signals to be provided over the optical communications link;
a receiving circuit receiving second optical signals from the optical communication link representative of data transmitted over the optical communication link and converting the second optical signals into second electrical signals to be provided to the data processing unit;
a link controller circuit receiving third electrical control signals from the data processing unit representative of control signals to be transmitted over the optical communications link and converting the third electrical signals into third optical signals to be transmitted over the optical communications link, and receiving fourth optical signals from the optical communication link representative of control signals transmitted over the optical communication link and converting the fourth optical signals into fourth electrical signals to be provided to the data processing unit;
an idle sense circuit monitoring the data processing unit to determine when signals are not present to be transmitted by the transmission circuit and in response providing a signal indicative of an idle condition; and
a receiver disable circuit disabling an output of the receiving circuit upon indication of the idle condition.

19. The subsystem of claim 18, comprising:
a transmitter disable circuit, the transmitter disable circuit stopping current flow to a laser upon indication of the idle condition; and
a loss of optical power indicator for signaling when no laser power is present, and controlling the receiver disable circuit.

20. The subsystem of claim 18, wherein the link controller circuit transports user messages.

21. The subsystem of claim 18, comprising conveying PCI-Express protocol information, wherein the link controller circuit provides PCI-Express auxiliary signals.

22. The subsystem of claim 18, wherein the link controller circuit enables emulation of a local bus interface across the optical communications link.

23. The subsystem of claim 18, wherein the link controller circuit includes a clock circuit for buffering clock signals, the clock circuit providing clock signals to the optical communications link.

24. A method of providing an optical link for PCI Express protocol information to be conveyed between a data processing unit and an optical communications link, the method comprising:
converting first electrical signals, representative of data to be transmitted from the data processing unit, from first electrical signals to first optical signals;
transmitting the first optical signals over an optical communications link;
converting second electrical signals, representative of control information to be transmitted, from second electrical signals to second optical signals;
transmitting the second optical signals over the optical communications link;
receiving third optical signals, representative of data being received over the optical communications link;
converting the third optical signals to third electrical signals;
providing the third electrical signals to the data processing unit;
receiving fourth optical signals, representative of control information being received over the optical communications link;
converting the fourth optical signals to electrical signals;
providing the fourth electrical signals to the data processing unit;
using the second optical signals to provide notification over the optical communications link when the data processing unit is connected or disconnected from the optical communications link.

25. The method of claim 24, comprising:
detecting when individual lanes of the optical communications link are coupled to the data processing unit; and
switching the termination impedance of the individual lanes coupled to the data processing unit when the individual lanes are not present.

26. The method of claim 24, comprising:
monitoring the data processing unit to determine when signals are present to be transmitted by the transmission circuit;
determining that signals are not present to be transmitted;
in response providing a signal over the optical communications link; and
disabling an output of a receiving circuit.

27. The method of claim 24, wherein the converting of the first electrical signals to first optical signals includes using a transmission circuit, the method comprising detecting when the data processing unit is not providing first electrical signals and in response reducing power consumption of the transmission circuit.

* * * * *